(12) United States Patent
Soviani et al.

(10) Patent No.: US 8,079,004 B2
(45) Date of Patent: Dec. 13, 2011

(54) EFFICIENT EXHAUSTIVE PATH-BASED STATIC TIMING ANALYSIS USING A FAST ESTIMATION TECHNIQUE

(75) Inventors: Cristian Soviani, Santa Clara, CA (US); Rachid N. Helaihel, Mountain View, CA (US); Khalid Rahmat, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 314 days.

(21) Appl. No.: 12/433,203

(22) Filed: Apr. 30, 2009

(65) Prior Publication Data

US 2010/0281445 A1    Nov. 4, 2010

(51) Int. Cl.
    G06F 17/50    (2006.01)
(52) U.S. Cl. ........... 716/108; 716/113; 716/136; 703/16
(58) Field of Classification Search .................. 716/108, 716/113, 136; 703/16
    See application file for complete search history.

(56) References Cited

U.S. PATENT DOCUMENTS

| | | | |
|---|---|---|---|
| 5,636,372 A * | 6/1997 | Hathaway et al. ............ | 713/500 |
| 7,278,126 B2 | 10/2007 | Sun | |
| 7,404,163 B2 | 7/2008 | Chadwick | |
| 7,694,254 B2 * | 4/2010 | Gregerson et al. ............ | 716/113 |
| 7,784,003 B2 * | 8/2010 | Buck et al. ..................... | 716/113 |
| 7,797,601 B2 * | 9/2010 | Kapur et al. ................... | 714/726 |
| 7,853,911 B1 * | 12/2010 | Fung et al. ..................... | 716/113 |
| 7,979,820 B1 * | 7/2011 | Patzer et al. ................... | 716/106 |
| 2008/0066036 A1 * | 3/2008 | Curtin et al. ...................... | 716/6 |
| 2008/0163147 A1 * | 7/2008 | Gregerson et al. ............... | 716/6 |
| 2008/0209372 A1 | 8/2008 | Buck | |
| 2008/0270962 A1 | 10/2008 | Chadwick | |
| 2010/0229137 A1 * | 9/2010 | Liu et al. ........................... | 716/6 |

OTHER PUBLICATIONS

Agarwal, A. et al., "Path-Based Statistical Timing Analysis Considering Inter-and Intra-die Corelations", In:Proc. TAU, pp. 16-21, 2002.

* cited by examiner

*Primary Examiner* — Phallaka Kik
(74) *Attorney, Agent, or Firm* — Park, Vaughan, Fleming & Dowler LLP (57) ABSTRACT

One embodiment of the present invention provides a system that performs an efficient path-based static timing analysis (STA) in a circuit design. During operation, the system identifies a set of paths within the circuit design, wherein each path includes one or more segments. For a path in the set of paths, the system determines if at least one segment in the path is shared with a different path which was previously computed by performing a path-based STA, wherein the at least one segment in the different path is associated with previously computed path-based timing information. If so, the system then performs an estimation of a path-based delay for the path based at least on the path-based timing information associated with the shared segment in the different path. Otherwise, the system computes a path-based delay for the path by performing a path-based STA on the path.

25 Claims, 9 Drawing Sheets

FIG. 9

EFFICIENT EXHAUSTIVE PATH-BASED STATIC TIMING ANALYSIS USING A FAST ESTIMATION TECHNIQUE

BACKGROUND

1. Field

The present invention generally relates to techniques for performing static timing analysis (STA) for integrated circuit (IC) chips. More specifically, the present invention relates to a method and an apparatus for performing an efficient exhaustive path-based STA by using a fast path-delay-estimation.

2. Related Art

Rapid advances in computing technology have made it possible to perform trillions of computational operations each second on data sets that are sometimes as large as trillions of bytes. These advances can be largely attributed to the exponential increase in the size and complexity of integrated circuits.

Due to the increase in size and complexity of integrated circuits, it has become necessary to use sophisticated tools to verify timing constraints.

Before the advent of Static Timing Analysis (STA), timing constraints were typically verified using simulation-based techniques. As the complexity of integrated circuits grew, using simulation-based techniques to verify timing constraints became impractical because of their long runtimes, low capacities, and incomplete analyses.

Unlike simulation-based techniques, STA verifies timing by computing the worst-case and the best-case delays without enumerating all possible paths. Because of this, STA can perform a thorough timing analysis for large integrated circuits within a reasonable amount of time. As a result, STA has emerged as the method of choice for verifying timing constraints for large integrated circuits.

During the STA stage of the integrated circuit (IC) design, both a graph-based STA and a path-based analysis are often used. A graph-based STA is very fast (O(N); N is the number of cells in a design), but the results are often pessimistic. A path-based STA is typically used to provide less pessimistic (and more accurate) estimates for timing slacks (or "slacks") than a graph-based STA. More specifically, path-based analysis is often performed after graph-based analysis by ordering the results from graph-based analysis, starting from the most pessimistic endpoint, and recomputing the slack to that endpoint for each path that terminates there. Path-based slacks are generally less pessimistic because they do not use the worst slew at each merge point in the timing graph, as required by graph-based analysis, but the relative improvement for each endpoint may vary.

Unfortunately, path-based STA is a computationally intensive process which can require tracing every possible path within a design. Although path-based STA is accurate, the amount of computation required to perform path-based STA can increase exponentially with the number of cells.

Hence, what is needed is a method and an apparatus that can reduce the runtime associated with an exhaustive path-based STA.

SUMMARY

One embodiment of the present invention provides a system that performs an efficient path-based static timing analysis (STA) in a circuit design. During operation, the system identifies a set of paths within the circuit design, wherein each path includes one or more segments. For a path in the set of paths, the system determines if at least one segment in the path is shared with a different path which was previously computed by performing a path-based STA, wherein the at least one segment in the different path is associated with previously computed path-based timing information. If so, the system then performs an estimation of a path-based delay for the path based at least on the path-based timing information associated with the shared segment in the different path. Otherwise, the system computes a path-based delay for the path by performing a path-based STA on the path.

In some embodiments, after performing the estimation, the system determines whether the path-based delay associated with the path is the worst path-based delay among the set of paths by first determining if the estimated path-based delay is greater than a threshold delay. If so, the system computes the path-based delay for the path by performing a path-based STA on the path. Otherwise, the system determines that the path-based delay is not the worst path-based delay among the set of paths. Note that the determination is made based on the estimated path-based delay without actually computing the path-based delay for the path delay, thereby reducing computational time.

In some embodiments, the system attempts to identify the worst path-based delay and the worst path-based slack among the set of paths.

In some embodiments, after performing the estimation, the system determines whether the path-based delay associated with the path is the best-case path-based delay among the set of paths by first determining if the estimated path-based delay is less than a threshold delay. If so, the system computes the path-based delay for the path by performing a path-based STA on the path. Otherwise, the system determines that the path-based delay is not the best-case path-based delay among the set of paths. Note that the determination is made based on the estimated path-based delay without actually computing the path-based delay for the path delay, thereby reducing computational time.

In some embodiments, the system attempts to identify the best-case path-based delay and the best-case path-based slack among the set of paths.

In some embodiments, the set of paths terminate on a common endpoint in the circuit design.

In some embodiments, the path-based timing information includes a path-based delay and a path-based slew.

In some embodiments, the system performs the estimation of the path-based delay for the path by estimating a path-based delay for the segment in the path based on the path-based delay and path-based slew associated with the same segment in the different path.

In some embodiments, each segment in the path is associated with a graph-based delay and a graph-based slew which was previously computed for the path based on a graph-based STA. Note that the graph-based delay and the graph-based slew provide the worst-case estimation for a path-based delay and a path-based slew associated with the path.

In some embodiments, the system performs the estimation of the path-based delay for the path by estimating the path-based delay for the segment in the path based on the graph-based slew associated with the segment.

In some embodiments, the system performs an estimation of the path-based delay for the path by making an estimation for each segment in the path. More specifically, for each segment, the system determines whether the segment is shared with another path which has been previously computed based on a path-based STA, wherein the segment in the other path is associated with previously computed path-based timing information. If so, the system performs an estimation of a path-based delay for the segment based on the path-based timing information associated with the shared segment in the other path. Otherwise, the system uses the graph-based delay associated with the segment as an estimated path-based delay for the segment. Finally, the system sums the estimated path-based delays for all segments in the path to obtain the estimated path-based delay for the path.

In some embodiments, the set of paths terminate on multiple endpoints in the circuit design.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Integrated Circuit Design Flow

Figure 1:
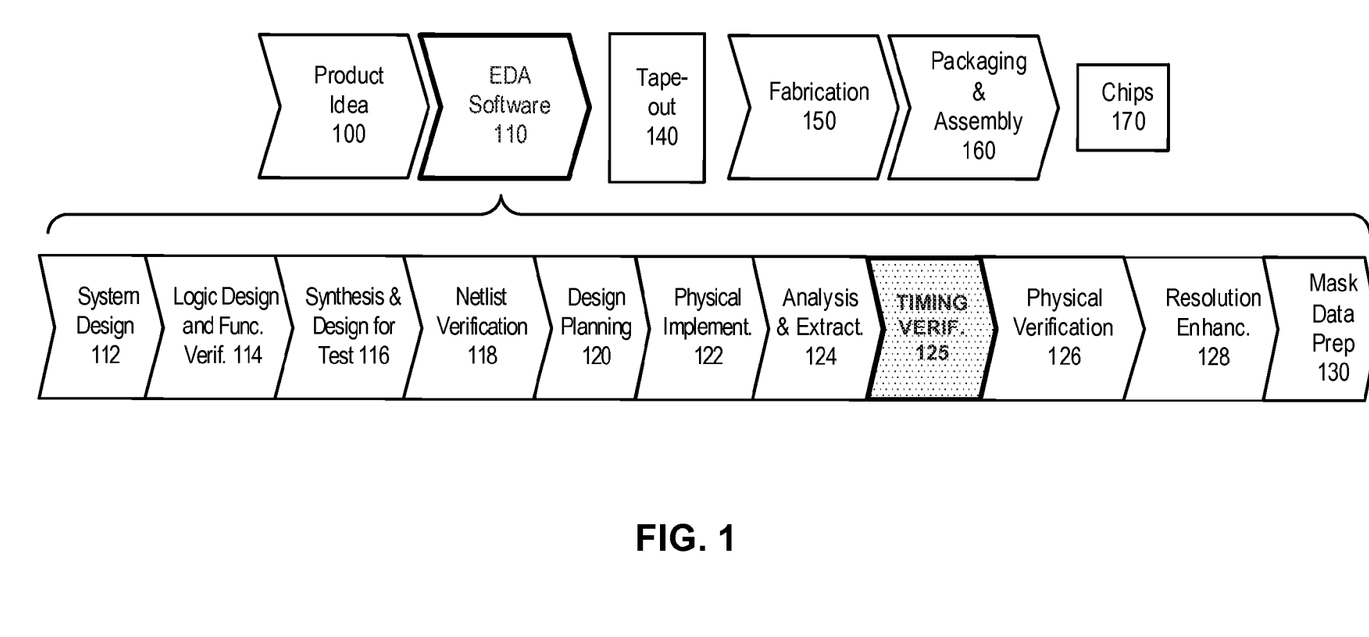
FIG. 1 illustrates various steps in the design and fabrication of an integrated circuit in accordance with an embodiment of the present invention.

FIG. 1 illustrates various steps in the design and fabrication of an integrated circuit. The process starts with the generation of a product idea (stage 100), which is realized using an Electronic Design Automation (EDA) software design process (stage 110). When the design is finalized, it can be taped-out (stage 140). After tape-out, the fabrication process is consummated (stage 150) and packaging and assembly processes (stage 160) are performed which ultimately result in finished chips (stage 170).

The EDA software design process (stage 110), in turn, comprises stages 112-130, which are described below. Note that this design flow description is for illustration purposes only. This description is not meant to limit the present invention. For example, an actual integrated circuit design may require a designer to perform the design stages in a different sequence than the sequence described herein. The following discussion provides further details of the stages in the design process.

System design (stage 112): The designers describe the functionality to implement. They can also perform what-if planning to refine the functionality and to check costs. Hardware-software architecture partitioning can occur at this stage. Exemplary EDA software products from SYNOPSYS, INC. that can be used at this stage include MODEL ARCHITECT®, SABER®, SYSTEM STUDIO®, and DESIGNWARE® products.

Logic design and functional verification (stage 114): At this stage, the VHDL or Verilog code for modules in the system is written and the design is checked for functional accuracy. More specifically, the design is checked to ensure that it produces the correct outputs. Exemplary EDA software products from SYNOPSYS, INC. that can be used at this stage include VCS®, VERA®, DESIGNWARE®R, MAGELLAN®, FORMALITY®, ESP® and LEDA® products.

Synthesis and design (stage 116): Here, the VHDL/Verilog is translated to a netlist. The netlist can be optimized for the target technology. Additionally, tests can be designed and implemented to check the finished chips. Exemplary EDA software products from SYNOPSYS, INC. that can be used at this stage include DESIGN COMPILER®, PHYSICAL COMPILER®, TEST COMPILER®, POWER COMPILER®, FPGA COMPILER®, TETRAMAX®, and DESIGNWARE® products.

Netlist verification (stage 118): At this stage, the netlist is checked for compliance with timing constraints and for correspondence with the VHDL/Verilog source code. Exemplary EDA software products from SYNOPSYS, INC. that can be used at this stage include FORMALITY®, PRIMETIME®, and VCS® products.

Design planning (stage 120): Here, an overall floor plan for the chip is constructed and analyzed for timing and top-level routing. Exemplary EDA software products from SYNOPSYS, INC. that can be used at this stage include ASTRO® and IC COMPILER® products.

Physical implementation (stage 122): The placement (positioning of circuit elements) and routing (connection of the same) occurs at this stage. Exemplary EDA software products from SYNOPSYS, INC. that can be used at this stage include the ASTRO® and IC COMPILER® products.

Analysis and extraction (stage 124): At this stage, the circuit function is verified at a transistor level; this, in turn, permits what-if refinement. Exemplary EDA software products from SYNOPSYS, INC. that can be used at this stage include ASTRORAIL®, PRIMERAIL®, PRIMETIME®, HSPICE®, HSIM®, NANOTIME®, NANOSIM® and STAR-RCXT® products.

Timing verification (stage 125): Static Timing Analysis (STA) typically takes place during this stage, in which the netlist is checked for compliance with timing constraints and for correspondence with the VHDL/Verilog source code. Exemplary EDA software products from SYNOPSYS, INC. that can be used at this stage include PRIMETIME® products.

Physical verification (stage 126): In this stage, the design is checked to ensure correctness for manufacturing, electrical issues, lithographic issues, and circuitry. Exemplary EDA software products from SYNOPSYS, INC. that can be used at this stage include the HERCULES® product.

Resolution enhancement (stage 128): This stage involves geometric manipulations of the layout to improve manufacturability of the design. Exemplary EDA software products from SYNOPSYS, INC. that can be used at this stage include PROTEUS®, PROTEUS®AF, and PSMGED® products.

Mask data preparation (stage 130): This stage provides the tape-out data for production of masks to produce finished chips. Exemplary EDA software products from SYNOPSYS, INC. that can be used at this stage include the CATS® family of products.

Embodiments of the present invention can be used during one or more of the above described steps. Specifically, one embodiment of the present invention can be used during the timing verification stage 125.

Static Timing Analysis (STA)

Figure 2:
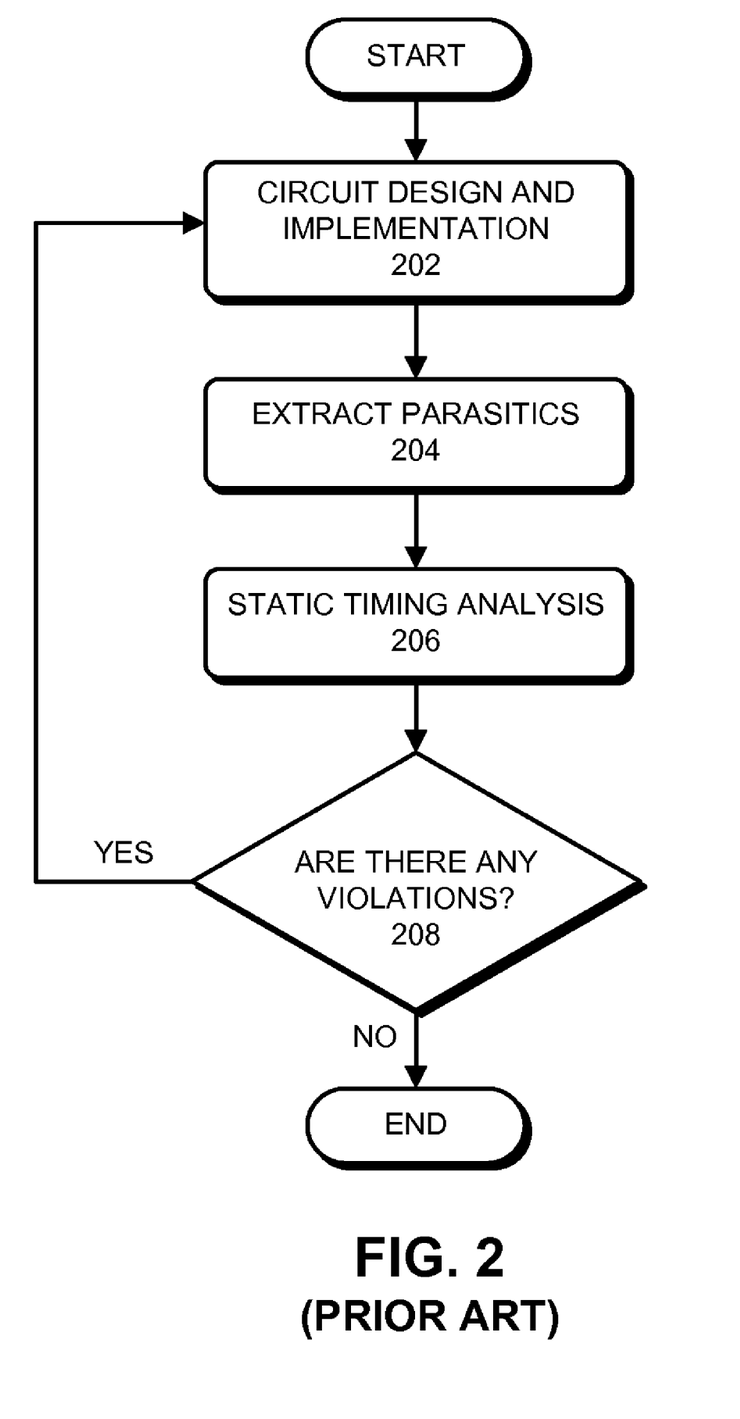
FIG. 2 presents a flowchart that illustrates how STA is typically used during the design and implementation of integrated circuits.

FIG. 2 presents a flowchart that illustrates how STA is typically used during the design and implementation of integrated circuits.

First an integrated circuit is designed (step 202). Next, the parasitics are extracted (step 204). Static timing analysis is then performed (step 206). If timing violations are found (step 208), the process goes back to the circuit design step 202, so that the circuit can be tweaked to fix the timing violations. On the other hand, if no timing violations are found, the process continues to the next step in the fabrication process.

Exhaustive Path-Based Analysis

Figure 3:
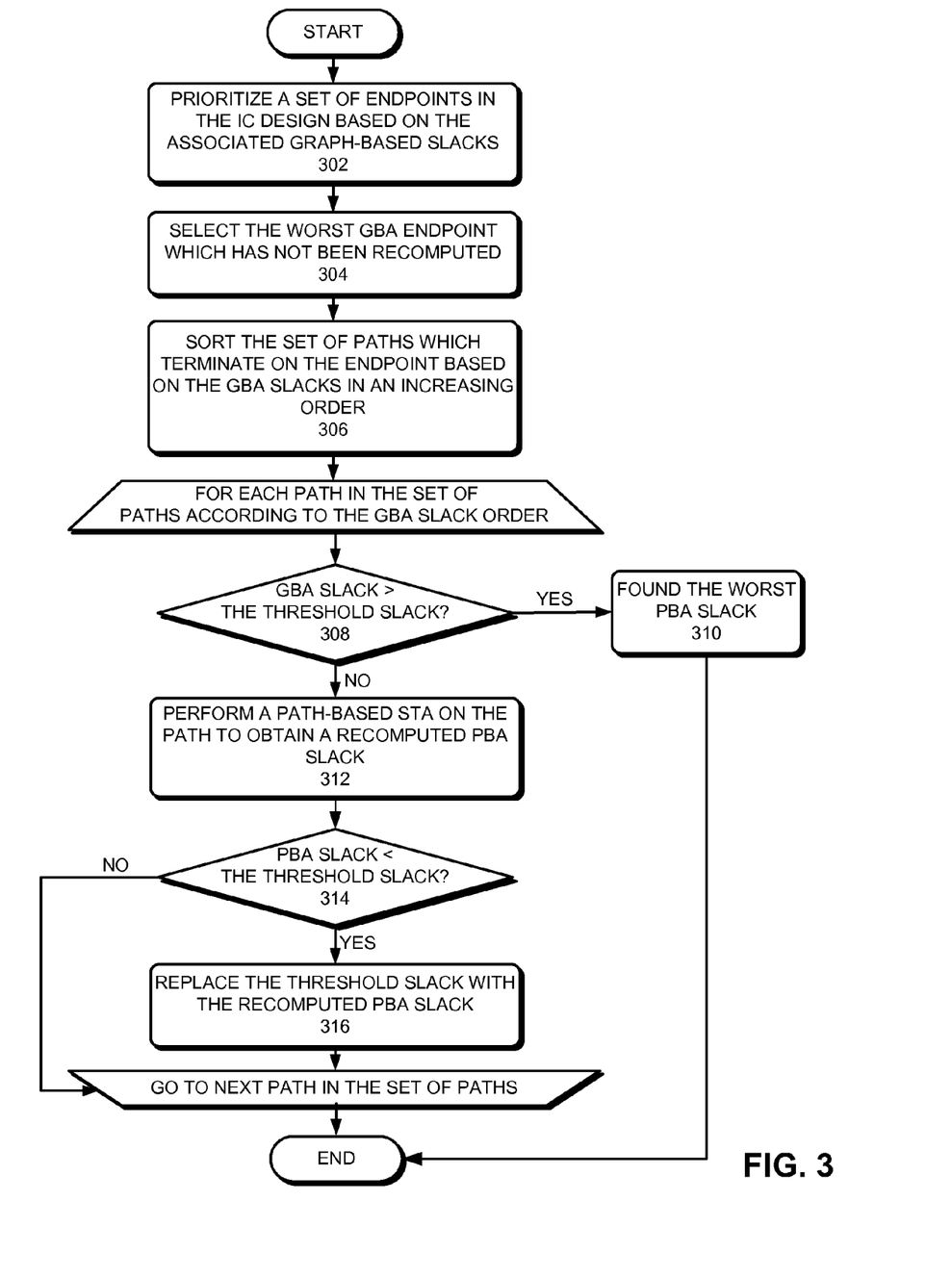
FIG. 3 presents a flowchart illustrating the process of performing a conventional exhaustive path-based STA on an IC design.

FIG. 3 presents a flowchart illustrating the process of performing a conventional exhaustive path-based STA on an IC design. This process searches for a path among a set of paths which has the worst recomputed path-based slack.

Prior to performing a path-based STA, it is assumed that a graph-based STA has been performed on the IC design. As a result, each timing endpoint ("endpoint" hereinafter), for example a flip-flop, is associated with a slack, referred to as a "graph-based STA slack," or "GBA slack." Note that the GBA slack for a given endpoint is obtained by first computing GBA slacks for the set of paths which terminate on the endpoint, and then choosing a worst GBA slack among the set of GBA slacks for the set of paths. In the discussion below, we refer to the process of performing a path-based STA on a given endpoint as a "recomputation," because it occurs after a graph-based STA has been performed.

To perform the exhaustive path-based STA, the system typically starts by prioritizing the set of endpoints in the IC design based on the associated GBA slacks (step 302). The system then selects an endpoint having the worst GBA slack (or "the worst GBA endpoint") which has not been recomputed (step 304). Next, the system sorts the set of paths which terminate on this endpoint based on their associated GBA slacks in an order of increasing slack value, i.e., a worse slack receives a higher priority (step 306).

More specifically, for each path among the set of paths in the GBA slack order, the system determines if the GBA slack is greater than a threshold slack (step 308). This threshold slack holds a current worst recomputed PBA slack, which is iteratively updated as more paths are processed. Typically, the threshold slack has a sufficiently large initial value which can be easily replaced by a recomputed PBA slack.

If the GBA slack for the currently processed path is greater than the threshold slack, the worst recomputed PBA slack has been found, which equals the threshold slack (step 310) and the process terminates. Note that this is rarely the case for the first path being processed (i.e., the path with the worst GBA slack).

If, however, the GBA slack for the currently processed path is less than the threshold slack, the system then performs a path-based STA on this path to obtain a recomputed PBA slack (step 312). Note that the recomputed PBA slack is typically greater than the GBA slack for the same path. The system subsequently determines if the recomputed PBA slack is less than the current threshold slack (step 314). If so, a new value for the worst PBA slack is found, and the system replaces the threshold slack with the newly recomputed PBA slack (step 316). The system then continues to process the next path in the set of paths in the prioritized order until the worst recomputed PBA slack among the set of paths is found.

If step 314 is false, i.e., the recomputed PBA slack is greater than the threshold slack, the system returns to process the next path in the set of paths in the prioritized order. The above process then repeats until the worst recomputed PBA slack is found.

By applying the exhaustive PBA slack computation process described in FIG. 3 for the prioritized endpoints, the system can identify the worst recomputed PBA slacks for those endpoints which are associated with the worst GBA slacks.

Figure 4:
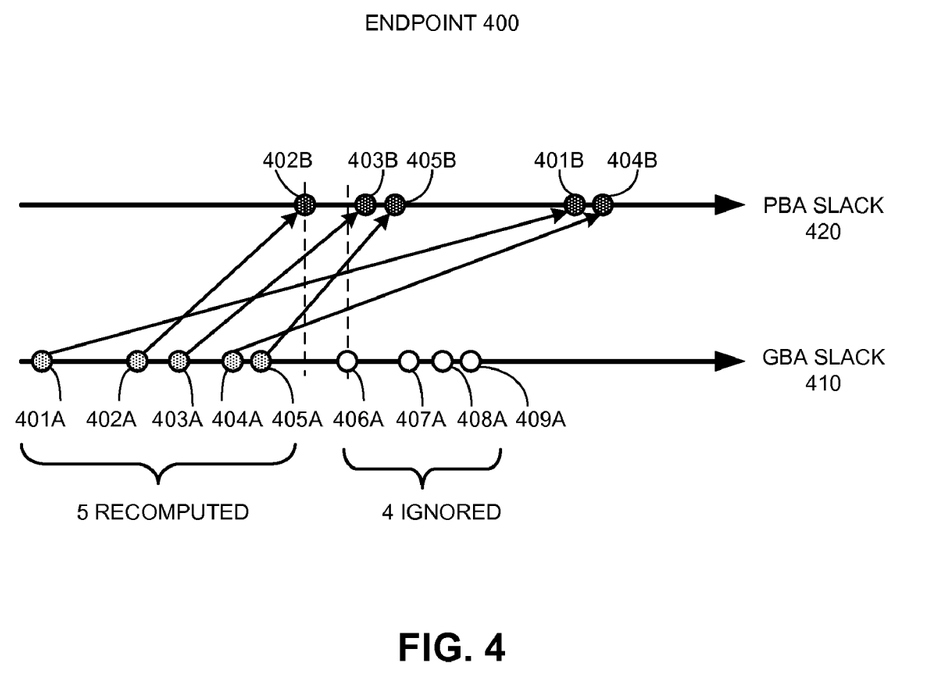
FIG. 4 illustrates performing an exhaustive PBA slack computation on an exemplary endpoint.

It should be pointed out that this exhaustive PBA slack computation process does not have to process every path in the set of paths which terminate on the selected endpoint. FIG. 4 illustrates performing an exhaustive PBA slack computation on an exemplary endpoint 400.

More specifically, FIG. 4 illustrates graphically the process of recomputing slack for a set of paths which terminate on endpoint 400. As shown in FIG. 4, a GBA slack axis 410 and a PBA slack axis 420 are drawn in a manner such that each GBA slack value on axis 410 equals a PBA slack value on axis 420 if the two values have the same horizontal position.

Note that the nine paths associated with respective GBA slacks 401A-409A (the nine circles) are arranged on GBA slack axis 410 in increasing order of GBA slacks, with the worst GBA slack of path 401A on the left end of axis 410. During the exhaustive PBA slack computation process, the set of paths are sequentially processed according to the technique described in FIG. 3, starting from a path associated with slack 401A (lightly shaded circle). This generates a recomputed PBA slack 401B (darkly shaded circle) on PBA slack axis 420, which is larger than GBA slack 401A, which is expected because a GBA slack is more pessimistic. Note that PBA slack 401B subsequently becomes the worst recomputed PBA slack (when no other values are available). Next, a path associated with GBA slack 402A is recomputed and a PBA slack 402B is obtained on PBA axis 420. Because PBA slack 402B is less than GBA slack 401B, slack 402B replaces 401B as the new worst PBA slack.

Similarly, paths associated with GBA slacks 403A, 404A, and 405A (all lightly shaded circles) are recomputed to obtain PBA slacks 403B, 404B, and 405B (all darkly shaded circles) on PBA axis 420, respectively. Note that each of GBA slacks 403A-405A is less than the worst PBA slack 402B. Moreover, each of the corresponding GBA slacks 403B-405B is greater than the worst PBA slack 402B. Hence, after recomputing PBA slack 405B, PBA slack 402B remains the worst PBA slack.

Next, a new path associated with GBA slack 406A (open circle) is processed. GBA slack 406A is first compared with the worst PBA slack 402B. Because GBA slack 406A is larger than the worst PBA slack 402B, the increasing values of the GPA slacks on GBA slack axis 410 ensure that the paths associated with GBA slacks 406A-409A (all open circles) will not produce an even smaller PBA slack value than the current worst PBA slack 402B. Consequently, these new paths are not recomputed, thereby saving computational resources, and the path-based STA reports the worst PBA slack for endpoint 400.

Note that although not all the paths are recomputed in FIG. 4, those paths associated with GBA slacks 403A-405A are fully recomputed, but the recomputed PBA slacks do not affect the result of searching for the worst PBA slack for endpoint 400.

An Improved Path-Based STA Using Fast Estimation

Embodiments of the present invention provide an improved path-based STA technique which can significantly reduce the number of paths that have to be recomputed using path-based STA. More specifically, if a new path or a portion (e.g., a segment) of the new path overlaps with one or more previously recomputed paths, it is not necessary to recompute the new path from scratch. Instead, one can reuse the path-based timing information associated with the paths that are already re-computed to quickly estimate the path delay for the new path that has not already been analyzed.

For example, if the first M paths which are fully recomputed are disjoint (i.e., have no common segments), while the next N new paths share some segments with some of the first M paths, then one can attempt to estimate the improvement of path-based analysis over the graph-based analysis in these new paths without recomputing all of the N new paths.

Note that under the general concept of reusing the paths already recomputed to estimate PBA delays for new paths, different estimation techniques may be used. One estimation technique combines timing information, such as PBA delays, and PBA slews from path-based STA with the worst-case slews already available from graph-based STA to generate sufficiently accurate estimation for path delays of new paths. This estimation is typically much faster than a full path-based STA computation.

Note that one goal of performing this fast estimation is to prune as many paths as possible during an exhaustive path-based STA. For example, when searching for the worst PBA slack for an endpoint, a fast estimation can be made for a new path, wherein the estimation can be compared with the current worst PBA delay/slack. If the estimated delay/slack is better than the current worst PBA delay/slack, the new path is pruned from further consideration. Thus, the present technique avoids recomputing PBA delay/slack on the new path.

Note that in this embodiment the estimation provides a timing bound for the new path. This estimation technique is described in more detail below.

The quality of the estimation technique often affects the amount of runtime improvement over the conventional path-based STA. If the estimation technique is of low quality (i.e., if the estimation criteria are more pessimistic), few paths may be pruned while many have to be recomputed. In contrast, if the estimation technique is of high quality (i.e., if the estimation criteria are less pessimistic), most of the paths can be pruned while few are recomputed. In one embodiment, an estimation technique is designed so that it produces results either substantially identical to the fully recomputed results, or more pessimistic compared to the fully recomputed results but at the same time as close as possible to the fully recomputed results. Such an estimation technique provides greater runtime improvement. In one embodiment, a properly designed estimation technique produces results which are less pessimistic than the graph-based STA results, but never optimistic compared to the fully recomputed path-based STA results.

Figure 5:
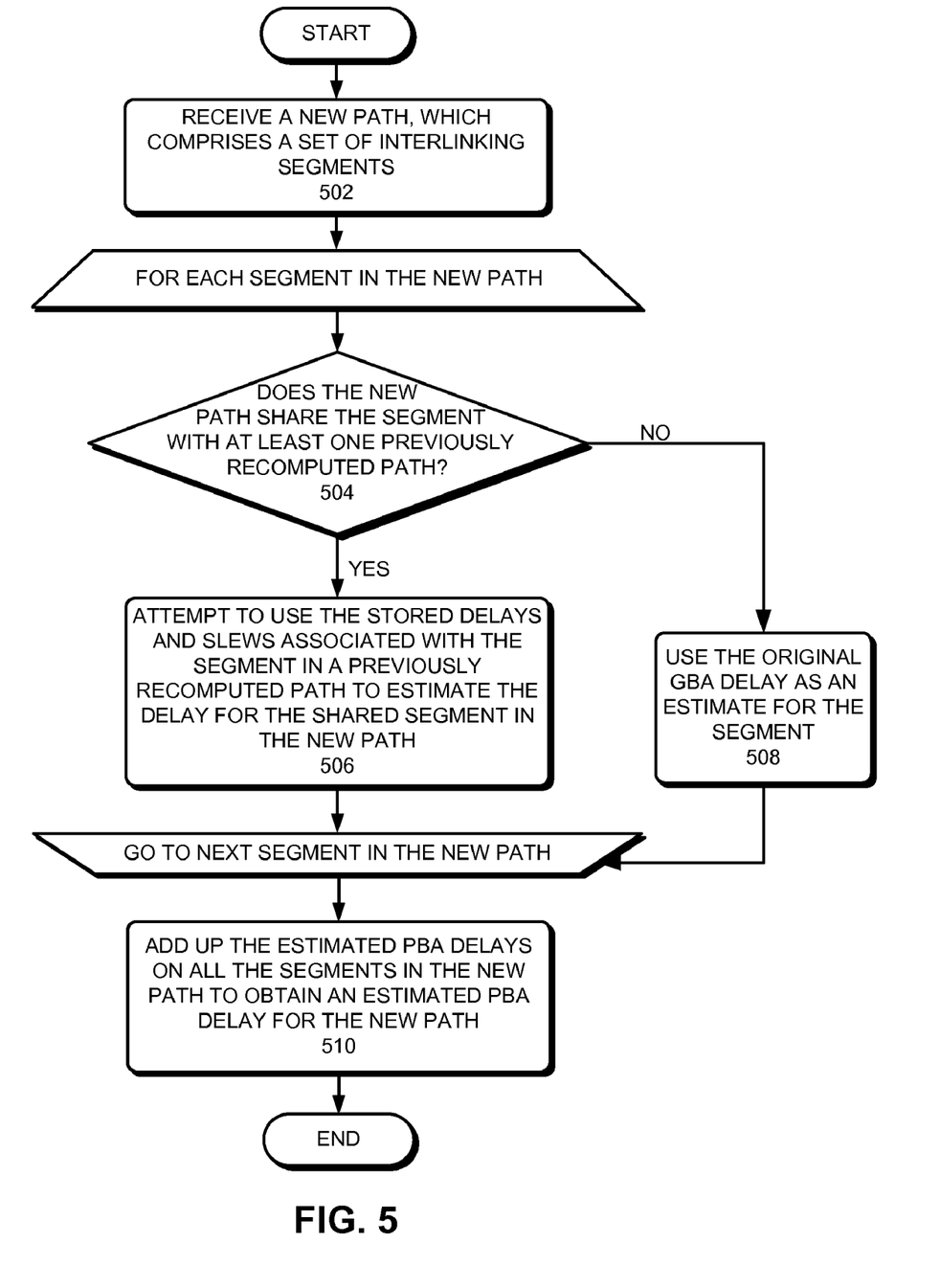
FIG. 5 presents a flowchart illustrating the process of performing an improved path-based STA on a new path using fast estimation in accordance with an embodiment of the present invention.

FIG. 5 presents a flowchart illustrating the process of performing an improved path-based STA on a new path using fast estimation in accordance with an embodiment of the present invention.

During operation, the system receives a new path, which comprises a set of interlinking segments (step 502). Note that each path has been previously computed with GBA delay/slack based on a graph-based STA. Hence, each segment in the new path is associated with a GBA delay, which can be used as a worst-case delay estimate. The sum of all GBA delays for the set of segments equals the GBA delay for the new path. This GBA delay can then be converted into the GBA slack for the same path. Recall that each segment is also associated with a common worst-case slew as is required by the graph-based STA.

Next, for each segment in the set of segments, the system determines if the new path shares the segment (i.e., overlaps) with at least one different path which was previously recomputed based on path-based STA (step 504).

Figure 6:
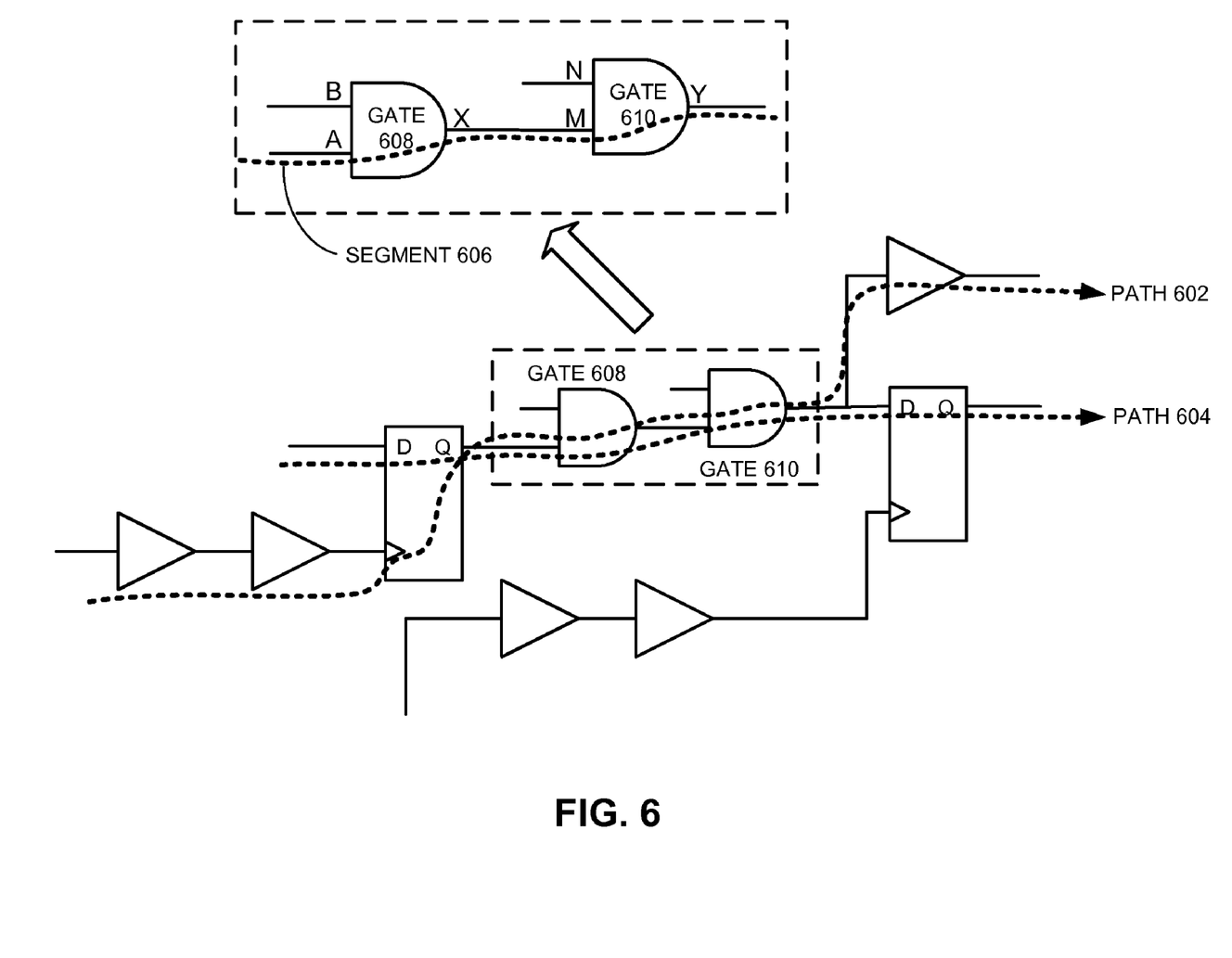
FIG. 6 illustrates a circuit schematic with two paths sharing a common segment in accordance with an embodiment of the present invention.

FIG. 6 illustrates a circuit schematic with two paths, namely, paths 602 and 604, sharing a common segment 606 in accordance with an embodiment of the present invention. More specifically, path 602 includes at least three buffers, one latch, and two AND gates 608 and 610. Path 604 includes one latch and also AND gates 608 and 610. Moreover, paths 602 and 604 overlap on segment 606, which includes AND gates 608 and 610.

In one embodiment of the present invention, each segment is defined as sequence of 4 pins, for example A-X-M-Y in FIG. 6. Note that both paths 602 and 604 go through pins A-X-M-Y. Furthermore, each segment also contains two fields: a key field and a data field. The key field is used to verify if a new path matches a given segment. This field further contains the 4 pins, 4 rise/fall directions, and the cell arc numbers, for example, numbers for arcs AX and MY. In this embodiment of a segment, for a segment in one path to match (or share) a segment in another path, the two segments have to have the same sequence of 4 pins, and same rise/fall directions on all matching pins.

The data field contains data structures for both the GBA-based and PBA-based delays and slews. The data field for a segment may contain the delays and slews that are needed to estimate the PBA delay for a new path that shares the same segment. The data field can also store some statistics (e.g., age, number of accesses, etc.). Note that the present invention can generally be applied to any type of segment structure.

Hence, the present invention is not limited to the specific segment structure as described above and illustrated in FIG. 6.

In some embodiments, the segments are stored in a cache. This cache is indexed by the key of each segment. The main data-structure storing the segments can simply be a table or a more advanced data structure to facilitate quick lookups and updates. Each segment can also be associated with a score. In one embodiment, this score can be the PBA delay over GBA delay improvement which can be guaranteed by the path-based STA. With this score, if a new segment has to be added while the cache is full, the system can remove the segment with the lowest score from the cache.

Referring back to FIG. 5, if step 504 is TRUE, the system then attempts to use the stored GBA and PBA delays and slews associated with the segment in a previously recomputed path to estimate the PBA delay for the shared segment in the new path (step 506). Note that several variations can occur during step 506. Ideally, if the delays and slews can be retrieved from the previously recomputed path, they can be subsequently used to perform the estimation for the new path. In some embodiments, however, the delays and slews are not available for a previously recomputed path. This can happen when multiple qualified paths exist and are identified at step 504, and only the path associated with the best values (e.g., the smallest delays) has the stored delays and slacks. In this case, the system needs to locate the path which contains the values among the multiple qualified paths. However, if multiple qualified paths all have stored delays and slews, the system can choose the path associated with the best values (e.g., the smallest delays) to estimate the delay for the shared segment in the new path. Note that these multiple qualified paths can either terminate on the same endpoint or terminate on different endpoints.

If step 504 turns out to be FALSE, that is, no matched path is found for this segment, the system uses the original GBA delay as a PBA delay estimate for the segment (step 508). Note that reusing the GBA delay does not make improvement on that segment.

Next, the system returns to process the next segment in the new path that has not been estimated and subsequently repeats steps 504-508. This process continues until all the segments in the new path have been estimated. At this point, the system adds up the estimated PBA delays on all the segments in the new path to obtain an estimated PBA delay for the new path (step 510). Ideally, this estimated PBA delay, and subsequently an estimated PBA slack, are significantly improved in accuracy over and less pessimistic than the original GBA delay/slack, due to the effect of the previously recomputed PBA values. If so, we have obtained the estimated PBA delay/slack in a very fast manner. In one embodiment, the full path estimation can then be used to decide whether to prune the new path from the associated path-based STA without recomputing, or the new path has to be recomputed. This process is described in more detail in conjunction with FIGS. 7 and 8 below.

In the worst-case scenario when the entire new path has no segment overlapped with other paths, the estimated PBA delay becomes the original GBA delay value and no improvement is made. This scenario typically occurs when the very first few paths in an IC design are processed. As is described below in FIG. 7, these paths typically have to be recomputed using path-based STA, and setting up the values for the future paths. As more and more delays and slews are recomputed, the number of overlapping segments increases and more estimations can be made on the path-based STA. In some embodiments, overlapping occurs and the estimation technique is applied as early as when the second path is being processed.

Note that one goal of using a quick estimation is to provide more accurate and less pessimistic PBA delays over the GBA delays on new paths. We now describe an estimation technique.

In one embodiment of the present invention, an estimation for a PBA delay for a segment in a new path is made based on both the PBA delay and the PBA slew previously computed for the same segment in a different path. Ideally, an estimation can be made by directly reusing the recomputed PBA delay as an estimate for PBA delay in the new path. However, this is generally incorrect because for a given segment, different slews at the input pin of the segment cause different PBA delays on the segment, wherein a large input slew results in a greater PBA delay. Because the slews associated with the new path are unknown, it is not immediately clear whether the PBA delay of a segment in the new path is larger or smaller than the recomputed PBA delay of the same segment in the different path.

Some embodiments of the present invention take into account the fact that the GBA delays are computed using the worst slews (i.e., the largest slew values) at each node in the timing graph. It is also noted that the change of PBA delay with the input slew is bounded determined by the electrical properties of the circuit. Based on these considerations, one can design a formula which provides an upper bound for the PBA delay degradation as the input slew increases.

For example, one formula uses the following expression to estimate an upper bound for the PBA delay of a shared segment in the new path.

$$D'' \leq D' + F(S - S''),$$

wherein S is the GBA slew on the segment, D'/S" are the PBA delay/slew for the segment in the already recalculated path, and D" is the PBA delay for the segment in the new path. Moreover, F( ) is a non-negative function of difference in between the two slews S and S". In one embodiment, $F(S-S'') = \alpha \times (S-S'')$, wherein $\alpha > 0$ is a slew-delay coefficient. Note that the above expression provides an estimate of the worst possible delay degradation of the new path based on both the PBA delay and the PBA slew of the previously computed segment. Note that the slews for the new path are not estimated by the estimation technique.

Figure 7:
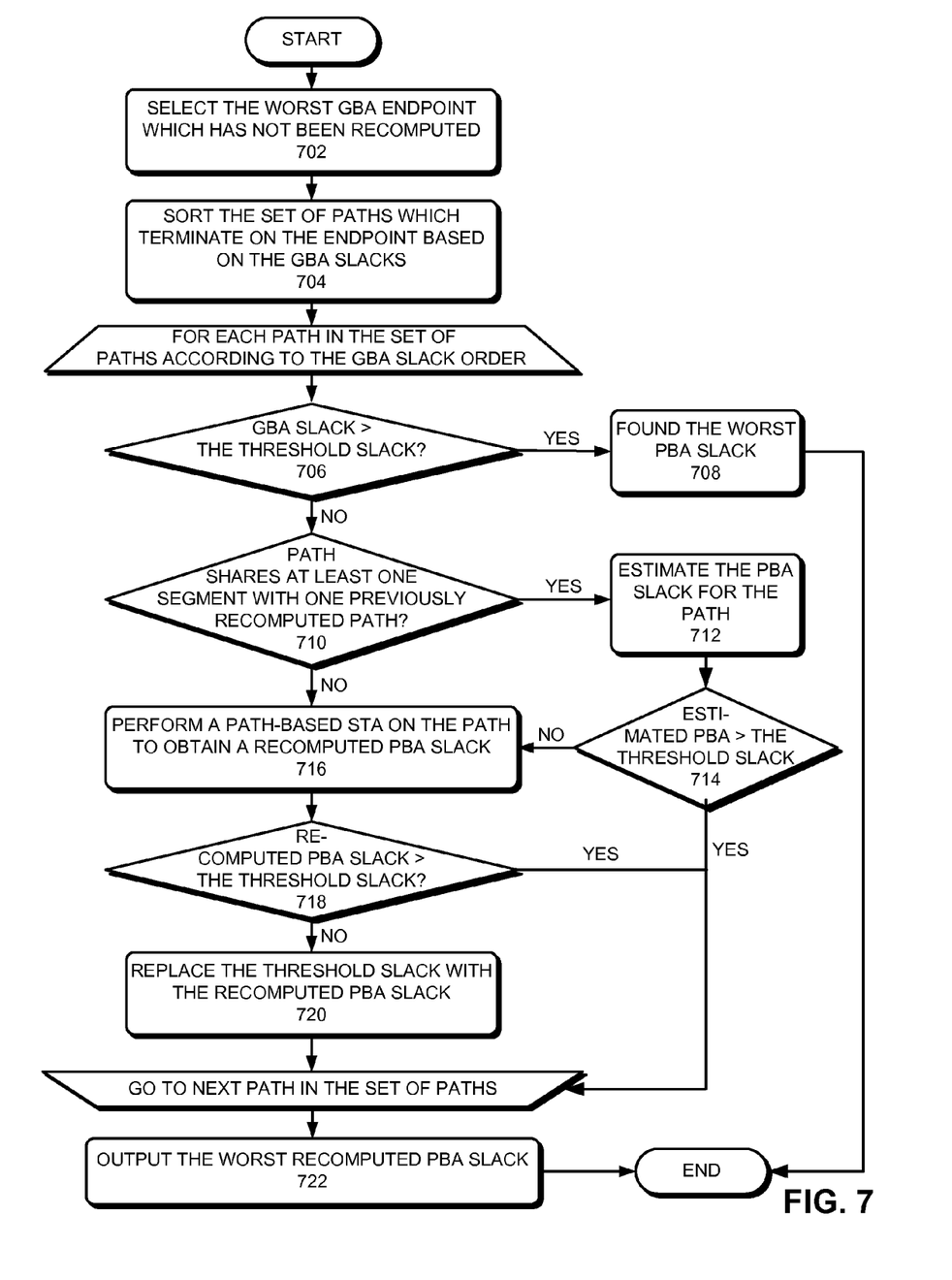
FIG. 7 presents a flowchart illustrating the process of performing an improved exhaustive path-based STA on an IC design in accordance with an embodiment of the present invention.

FIG. 7 presents a flowchart illustrating the process of performing an improved exhaustive path-based STA on an IC design in accordance with an embodiment of the present invention. Similar to the conventional process described in FIG. 3, this process searches for a path among a set of paths which terminate on a given endpoint which has the worst recomputed PBA slack.

The system typically starts by prioritizing a set of endpoints in the IC design based on the associated GBA slacks (not shown in FIG. 7). The system then selects an endpoint having the worst GBA slack (or "the worst GBA endpoint") which has not been recomputed (step 702). Next, the system sorts the set of paths which terminate on this endpoint based on their associated GBA slacks in an order of increasing slack value, i.e., a worse slack receives a higher priority (step 704).

Next, for each path among the set of paths in the GBA slack order, the system determines if the GBA slack is greater than a threshold slack (step 706). Note that this threshold slack holds a current worst recomputed PBA slack, which is iteratively updated as more paths are processed. Typically, the threshold slack has a sufficiently large initial value which can be easily replaced by a recomputed PBA slack.

If the GBA slack for the currently processed path is greater than the threshold slack, the worst recomputed PBA slack has been found, which equals the threshold slack (step 708) and the process terminates. Note that this is rarely the case for the first path being processed (i.e., the one with the worst GBA slack).

If, however, the GBA slack for the currently processed path is less than the threshold slack, the system subsequently determines if the path has at least one segment that has been recomputed using the path-based STA in a different path which shares the same segment (step 710). Note that this different path can be any path in the IC design, and hence is not limited to a path in the set of paths being processed.

If step 710 is TRUE, the system quickly estimates the PBA slack for the path, for example, using the estimation process described in conjunction with FIG. 5 (step 712). The system subsequently determines if the estimated PBA slack is greater than the current threshold slack (step 714). If so, the system determines that the current path is not associated with the worst PBA slack, and hence the path can be pruned. Consequently, the system does not recompute the PBA slack on this path, and computational resources are saved. The system then returns to process the next path in the set of paths in the prioritized order. Note that this comparison is safe because the estimated PBA slack is the lower bound (i.e., a more pessimistic value) for the actual PBA slack associated with this path. In other words, if step 710 is TRUE, then it is also TRUE if the estimated PBA slack is replaced by the actual PBA slack.

If, however, either step 710 or step 714 determination is FALSE, i.e., either the path has no previously recomputed segment or the estimated PBA is less than the threshold slack, the system subsequently performs a path-based STA on the path to obtain a recomputed PBA slack (step 716). The system then determines if the recomputed PBA slack is greater than the current threshold slack (step 718). If so, the system determines that the current path is not associated with the worst PBA slack, and returns to process the next path in the set of paths in the prioritized order.

Otherwise, a new worst PBA slack is found, and the system replaces the threshold slack with the recomputed PBA slack (step 720). The system next continues to process the next path in the set of paths in the prioritized order until the worst recomputed PBA slack is found. The system finally outputs the worst recomputed PBA slack (step 722). One significant improvement of this process over the conventional process in FIG. 3 is that, in this process, very few paths are actually recomputed.

Figure 8:
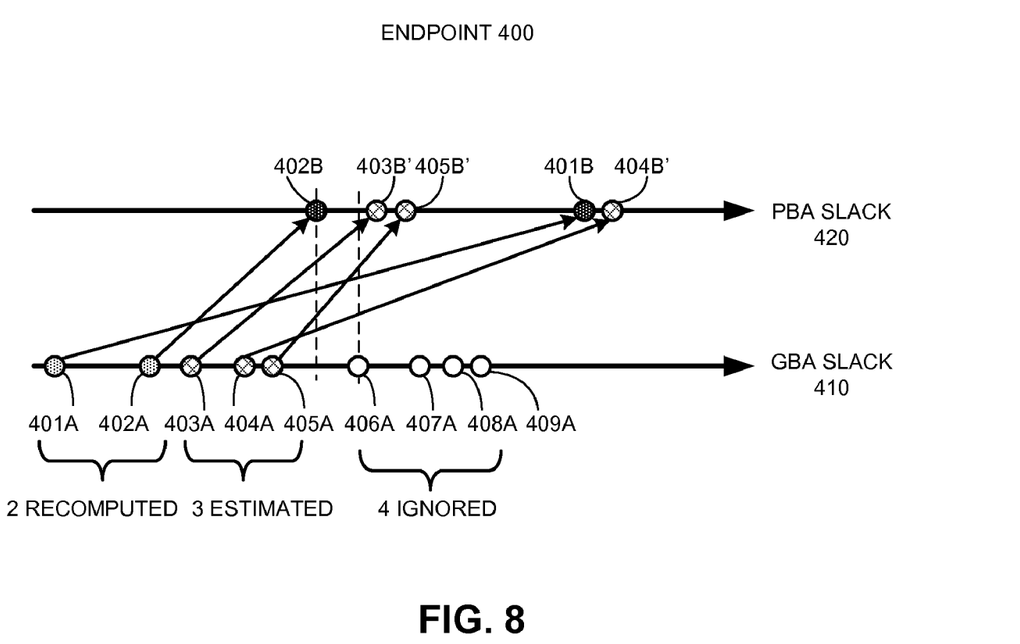
FIG. 8 illustrates performing an improved exhaustive PBA slack computation on the exemplary endpoint in FIG. 4 in accordance with an embodiment of the present invention.

FIG. 8 illustrates performing an improved exhaustive PBA slack computation on the exemplary endpoint 400 in FIG. 4 in accordance with an embodiment of the present invention.

During an improved exhaustive PBA slack computation process, the set of paths associated with GBA delays 401A-409A are sequentially processed according to the technique described in FIG. 7, starting from a path associated with slack 401A (lightly shaded circle). For simplicity, we refer to a path by its GBA slack value. After recomputing paths associated with GBA slacks 401A and 402A without using estimation, slack 402B (darkly shaded circles) is identified as the worst PBA slack.

Next, path 403A is processed. In this example, path 403A has overlapping segments with previously recomputed paths, including but not limited to paths 401A and 402A (i.e., including paths which terminate on other endpoints). Hence, path 403A is estimated, and the estimated PBA slack is shown on PBA slack axis 420 as 403B', which is an estimation of actual PBA slack 403B. Path 403A is subsequently dropped because 403B' is greater than 402B. Similarly, paths 404A and 405A are also estimated and subsequently dropped. Note that in FIG. 8, the estimated paths 403A-405A are represented by crosshatched circles to distinguish them from recomputed paths 401A and 402A. Similar to FIG. 4, paths 406A-409A are not recomputed or estimated.

In comparison to the process described in FIG. 4, only two paths are recomputed in FIG. 8, a reduction of three paths from before. However, the improved process produces the same worst PBA slack 402B as the conventional process.

Note that although we describe the present estimation technique in the context of an exhaustive search for the worst-case PBA delays and slacks, the present estimation technique can also be used to perform an exhaustive search for the best-case PBA delays and slacks. In order to do so, the process described in FIG. 7 is modified so that the threshold slack now represents the best recomputed PBA slack, and conditions in steps 706, 714 and 718 are simply reserved. Moreover, a new estimation technique for the delay on a segment needs to provide a lower bound for the actual PBA delay, instead of an upper bound. Generally, the present estimation technique can be applied to any path-based STA process.

In some embodiments, the effectiveness of the present technique can be further improved by increasing parallelism, such as by using multi-threads or other parallel techniques. By simultaneously processing more paths and more endpoints in an IC design, more previously recomputed timing information becomes available when a new path is being analyzed.

Figure 9:
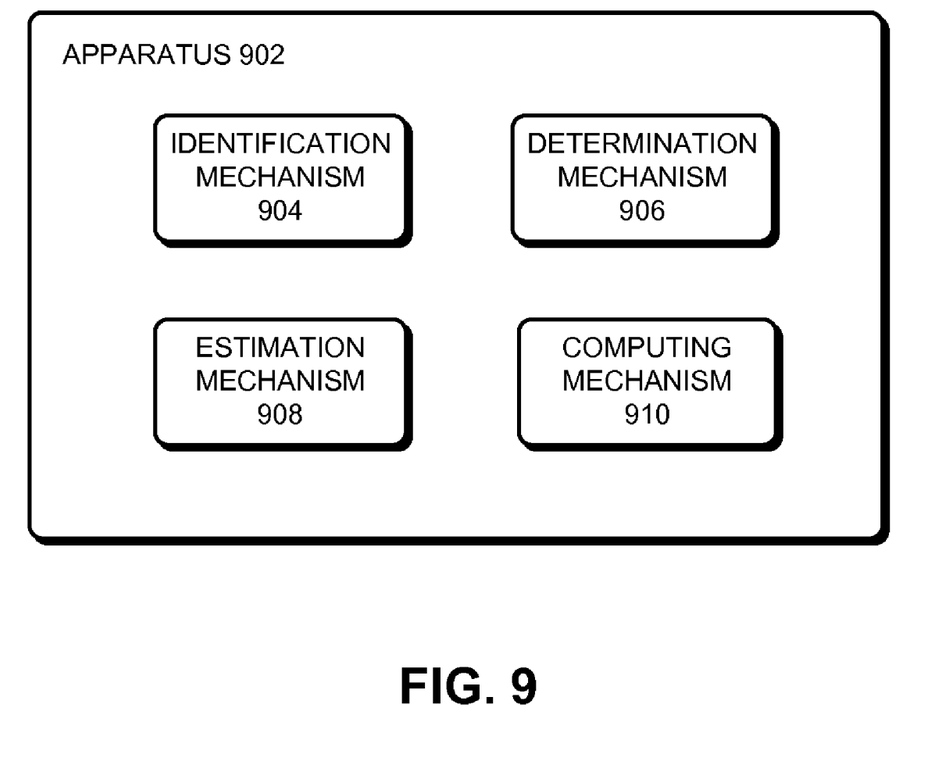
FIG. 9 illustrates an apparatus that performs an efficient path-based STA in an IC design in accordance with an embodiment of the present invention.

FIG. 9 illustrates an apparatus that performs an efficient path-based STA in an IC design in accordance with an embodiment of the present invention.

Apparatus 902 can comprise mechanisms which communicate with one another via a wire or wireless communication channel. Specifically, apparatus 902 can comprise an identification mechanism 904, a determination mechanism 906, an estimation mechanism 908, and a computing mechanism 910. Each of the above mechanisms may be realized using one or more integrated circuits or as a module of a general purpose processor. Apparatus 902 can be part of a computer system.

In some embodiments, identification mechanism 904 may be configured to identify a set of paths within the IC design, wherein each path comprises one or more segments; determination mechanism 906 may be configured to determine if at least one segment in a path among the set of paths is shared with a different path which was previously computed by performing a path-based STA, wherein the at least one segment in the different path is associated with previously computed path-based timing information; estimation mechanism 908 may be configured to perform an estimation of a path-based delay for the path based at least on the path-based timing information associated with the shared segment in the different path; and computing mechanism 910 may be configured to compute a path-based delay for the path by performing a path-based STA on the path.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing an efficient path-based static timing analysis (STA) in a circuit design, the method comprising:

identifying a set of paths within the circuit design, wherein each path comprises one or more segments;

for a path in the set of paths, determining, by computer, if at least one segment in the path is shared with a different path which was previously computed by performing a path-based STA, wherein the at least one segment in the different path is associated with previously computed path-based timing information; and if so, performing an estimation of a path-based delay for the path based at least on the path-based timing information associated with the shared segment in the different path;

otherwise, computing a path-based delay for the path by performing a path-based STA on the path, wherein the method reduces computational time by reusing timing information associated with previously computed paths to quickly estimate path-based delays for paths which have not been analyzed.

2. The method of claim 1, wherein after performing the estimation, the method further comprises determining if the path-based delay associated with the path is a worst-case path-based delay among the set of paths by:

determining if the estimated path-based delay is greater than a threshold delay; and if so, computing the path-based delay for the path by performing a path-based STA on the path;

otherwise, determining that the path-based delay is not the worst-case path-based delay among the set of paths, wherein the determination is made based on the estimated path-based delay without actually computing the path-based delay for the path delay, thereby reducing computational time.

3. The method of claim 2, wherein the method is used to identify the worst-case path-based delay and a worst-case path-based slack among the set of paths.

4. The method of claim 1, wherein after performing the estimation, the method further comprises determining if the path-based delay associated with the path is a best-case path-based delay among the set of paths by:

determining if the estimated path-based delay is less than a threshold delay; and if so, computing the path-based delay for the path by performing a path-based STA on the path;

otherwise, determining that the path-based delay is not the best-case path-based delay among the set of paths, wherein the determination is made based on the estimated path-based delay without actually computing the path-based delay for the path delay, thereby reducing computational time.

5. The method of claim 4, wherein the method is used to identify the best-case path-based delay and a best-case path-based slack among the set of paths.

6. The method of claim 1, wherein the set of paths terminate on a common endpoint in the circuit design.

7. The method of claim 1, wherein the path-based timing information includes a path-based delay and a path-based slew.

8. The method of claim 7, wherein performing the estimation of the path-based delay for the path involves estimating a path-based delay for the segment in the path based at least on the path-based delay and path-based slew associated with the same segment in the different path.

9. The method of claim 8, wherein each segment in the path is associated with a graph-based delay and a graph-based slew which was previously computed for the path based on a graph-based STA, wherein the graph-based delay and the graph-based slew provide the worst-case estimation for a path-based delay and a path-based slew associated with the path.

10. The method of claim 9, wherein performing the estimation of the path-based delay for the path involves estimating the path-based delay for the segment in the path based at least on the graph-based slew associated with the segment.

11. The method of claim 10, wherein performing an estimation of the path-based delay for the path further involves:

for each segment in the path, determining if the segment is shared with another path which has been previously computed based on a path-based STA, wherein the segment in the other path is associated with previously computed path-based timing information;

if so, performing an estimation of a path-based delay for the segment based at least on the path-based timing information associated with the shared segment in the other path;

otherwise, using the graph-based delay associated with the segment as an estimated path-based delay for the segment; and summing the estimated path-based delays for all segments in the path to obtain the estimated path-based delay for the path.

12. The method of claim 1, wherein the set of paths terminate on multiple endpoints in the circuit design.

13. A non-transitory computer readable storage medium storing instructions that when executed by a computer cause the computer to perform a method for performing an efficient path-based static timing analysis (STA) in a circuit design, the method comprising:

identifying a set of paths within the circuit design, wherein each path comprises one or more segments;

for a path in the set of paths, determining if at least one segment in the path is shared with a different path which was previously computed by performing a path-based STA, wherein the at least one segment in the different path is associated with previously computed path-based timing information; and if so, performing an estimation of a path-based delay for the path based at least on the path-based timing information associated with the shared segment in the different path;

otherwise, computing a path-based delay for the path by performing a path-based STA on the path, wherein the method reduces computational time by reusing timing information associated with previously computed paths to quickly estimate path-based delays for paths which have not been analyzed.

14. The non-transitory computer readable storage medium of claim 13, wherein after performing the estimation, the method further comprises determining if the path-based delay associated with the path is a worst-case path-based delay among the set of paths by:

determining if the estimated path-based delay is greater than a threshold delay; and if so, computing the path-based delay for the path by performing a path-based STA on the path;

otherwise, determining that the path-based delay is not the worst-case path-based delay among the set of paths, wherein the determination is made based on the estimated path-based delay without actually computing the path-based delay for the path, thereby reducing computational time.

15. The non-transitory computer readable storage medium of claim 14, wherein the method is used to identify a worst-case path-based delay and the worst-case path-based slack among the set of paths.

16. The non-transitory computer readable storage medium of claim 13, wherein after performing the estimation, the method further comprises determining if the path-based delay associated with the path is a best-case path-based delay among the set of paths by:
determining if the estimated path-based delay is less than a threshold delay; and
if so, computing the path-based delay for the path by performing a path-based STA on the path;
otherwise, determining that the path-based delay is not the best-case path-based delay among the set of paths, wherein the determination is made based on the estimated path-based delay without actually computing the path-based delay for the path, thereby reducing computational times.

17. The non-transitory computer readable storage medium of claim 16, wherein the method is used to identify the best-case path-based delay and a best-case path-based slack among the set of paths.

18. The non-transitory computer readable storage medium of claim 13, wherein the set of paths terminate on a common endpoint in the circuit design.

19. The non-transitory computer readable storage medium of claim 13, wherein the path-based timing information includes a path-based delay and a path-based slew.

20. The non-transitory computer readable storage medium of claim 19, wherein performing the estimation of the path-based delay for the path involves estimating a path-based delay for the segment in the path based at least on the path-based delay and path-based slew associated with the same segment in the different path.

21. The non-transitory computer readable storage medium of claim 20, wherein each segment in the path is associated with a graph-based delay and a graph-based slew which was previously computed for the path based on a graph-based STA, wherein the graph-based delay and the graph-based slew provide the worst-case estimation for a path-based delay and a path-based slew associated with the path.

22. The non-transitory computer readable storage medium of claim 21, wherein performing the estimation of the path-based delay for the path involves estimating the path-based delay for the segment in the path based at least on the graph-based slew associated with the segment.

23. The non-transitory computer readable storage medium of claim 22, wherein performing an estimation of the path-based delay for the path further involves:
for each segment in the path,
determining if the segment is shared with another path which has been previously computed based on a path-based STA, wherein the segment in the other path is associated with previously computed path-based timing information;
if so, performing an estimation of a path-based delay for the segment based at least on the path-based timing information associated with the shared segment in the other path;
otherwise, using the graph-based delay associated with the segment as an estimated path-based delay for the segment; and
summing the estimated path-based delays for all segments in the path to obtain the estimated path-based delay for the path.

24. The non-transitory computer readable storage medium of claim 13, wherein the set of paths terminate on multiple endpoints in the circuit design.

25. An apparatus that performs an efficient path-based static timing analysis (STA) in a circuit design, comprising:
an identification mechanism configured to identify a set of paths within the circuit design, wherein each path comprises one or more segments;
a determination mechanism configured to determine if at least one segment in a path among the set of paths is shared with a different path which was previously computed by performing a path-based STA, wherein the at least one segment in the different path is associated with previously computed path-based timing information;
an estimation mechanism configured to perform an estimation of a path-based delay for the path based at least on the path-based timing information associated with the shared segment in the different path; and
a computing mechanism configured to compute a path-based delay for the path by performing a path-based STA on the path,
wherein the apparatus reduces computational time by reusing timing information associated with previously computed paths to quickly estimate path-based delays for paths which have not been analyzed.

* * * * *